March 2, 1965 R. H. SCHUMAN 3,172,026
POSITIONAL SERVO SYSTEM OF THE DIGITAL COMPARATOR TYPE
Filed March 23, 1961 4 Sheets-Sheet 1

INVENTOR.
RALPH H. SCHUMAN
BY Hudson, Boughton,
Williams, David & Hoffmann
ATTORNEYS

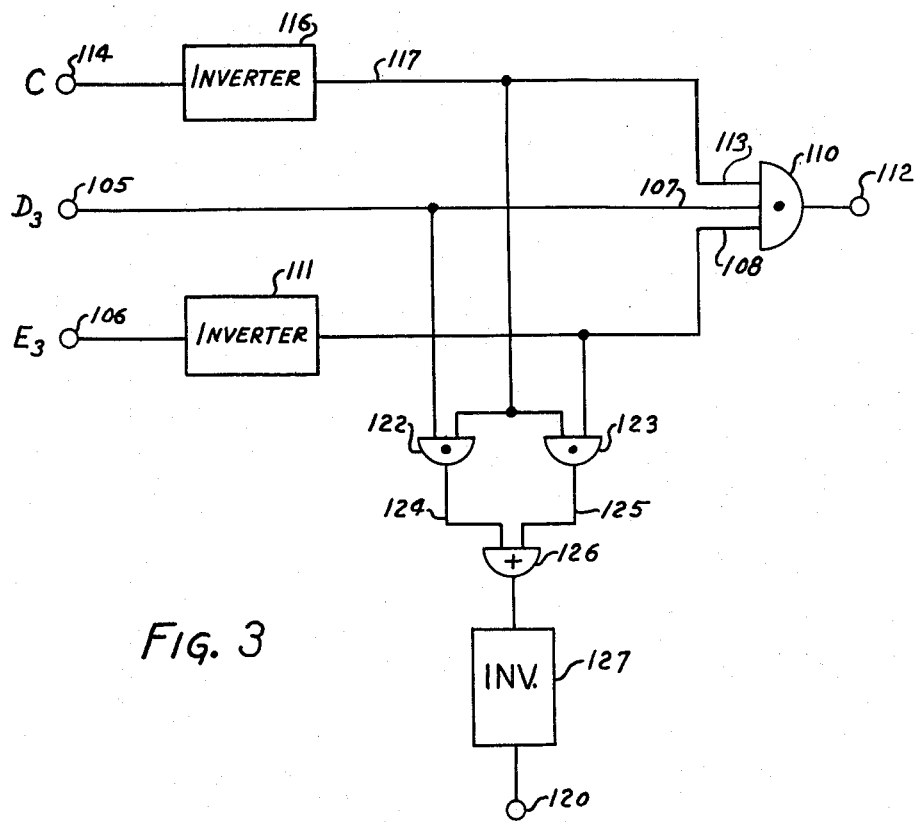

United States Patent Office 3,172,026
Patented Mar. 2, 1965

3,172,026
POSITIONAL SERVO SYSTEM OF THE
DIGITAL COMPARATOR TYPE
Ralph H. Schuman, Cleveland, Ohio, assignor to The
Warner & Swasey Company, Cleveland, Ohio, a corporation of Ohio
Filed Mar. 23, 1961, Ser. No. 97,947
14 Claims. (Cl. 318—28)

The present invention relates to a system for positioning a movable member in accordance with an electrical manifestation, which might be a plurality of electrical signals capable of assuming either one of two magnitudes to represent the values of the digits of a multidigit binary number which indicates the displacement of a position from a reference position.

Movable members, such as the slides of machine tools, have been positioned by systems which compare an electrical manifestation, for example, an electrical manifestation representing a multidigit number which indicates the actual displacement of the member from a reference position, with a corresponding electrical manifestation which represents the displacement of a destination position from the reference position and which system effects movement of the member toward the destination position until the manifestation indicating the actual displacement of the slide is changed to correspond to the destination manifestation. The system may be one in which the positioning is always done in one direction so that the destination position is either always higher or smaller than the number representing the actual position of the movable member, or the system might be one where the movable member can be moved in either direction to a destination position which might be represented by a number which is either higher or lower than the number corresponding to the actual position of the member.

Preferably, the positioning system is such that the controlled member can be made to initially approach the destination position at a relatively high speed and the speed changed to make the final approach to the destination position at a low speed to thereby reduce the danger of overshoot.

It is an important object of the present invention to provide a positioning system for moving a controlled member to a destination position with the actual position of the controlled member being represented by an electrical manifestation which is representative of the displacement of the controlled member from a reference position and with the destination position being represented by a second electrical manifestation representative of the displacement of the destination position from the position, and wherein comparator means is provided for comparing the two electrical manifestations and effects movement of the movable member toward the position until the electrical manifestations are made to correspond, with the system being so constructed and arranged that an increment is alegbraically added to one of the manifestations to modify the manifestation and produce correspondence of the electrical manifestations being compared at an intermediate position in advance of the destination position and so that upon the movement of the controlled member to the intermediate position, the rate of movement of the member is reduced and the modification is removed so that the comparing means then operates to compare the electrical manifestation representing the destination position with the electrical manifestation representing the actual position of the controlled member.

It is another object of the present invention to provide a new and improved positioning system as in the preceding object wherein the controlled member can be moved under the control of the comparing means to a destination position closer to or farther from the reference position than the actual position of the controlled member, and wherein the increment for effecting a modification of one of the numbers is added to or subtracted from one of the electrical manifestations, depending upon the direction of movement necessary to move the controlled member to the destination position.

Another object of the present invention is to provide a new and improved positioning system wherein a comparator operates to compare an electrical manifestation representing the actual position of a controlled member with an electrical manifestation representing a destination position to which the controlled member is to be moved by movement in a first direction and has an output which has one characteristic until the controlled member arrives at the destination position and then changes its characteristic to a second characteristic to signal the arrival of the controlled member, the system including means for modifying the electrical manifestations being compared by adding an increment to one manifestation to cause a change in the output characteristics from the comparator when the controlled member moves within a preset distance of the destination position and in which sequence circuitry is utilized to first effect movement of the controlled member when the comparator indicates that the movable member must be moved in the first direction to the destination position, and then to remove the increment and slow the movement of the controlled member in response to the change in output of the comparator upon arriving at the intermediate position, and upon the first change in output after the removal of the increment conditioning the circuit to stop the controlled member upon the next subsequent change in comparator output.

A further object of the present invention is to provide a new and improved positioning system wherein a comparator has one output when the movable member is to be moved in one direction to the position and a second output when the movable member crosses the destination position and in which the system can be set so that the output of the comparator is used to effect the slowing down of the movable member at a predetermined distance from the destination position without requiring special instructions for each positioning and to effect the continued movement at a slow rate until the final destination position is reached.

A still further object of the present invention is to provide a new and improved positioning system wherein a comparator has one output when a movable member is to be moved in one direction to a destination position and a second output when the member moves through the destination position to a position on the other side thereof and in which the outputs are utilized to effect the positioning of the member at the destination position from either direction and preferably to also effect a slowdown of the member in advance of the position.

The present invention also contemplates the use in a positioning system of a comparator having different outputs when on different sides of a destination position so that the system can be made responsive to the different outputs to effect movement and stopping whereby the system need not rely on response to an output which occurs only at the destination position.

Further objects and advantages of the present invention will be apparent from the following detailed description of the preferred embodiment thereof made with reference to the accompanying drawings forming a part of the present specification, and in which:

FIG. 3 is a logic diagram of one stage of the comparator shown in FIG. 2A.

Figure 1:
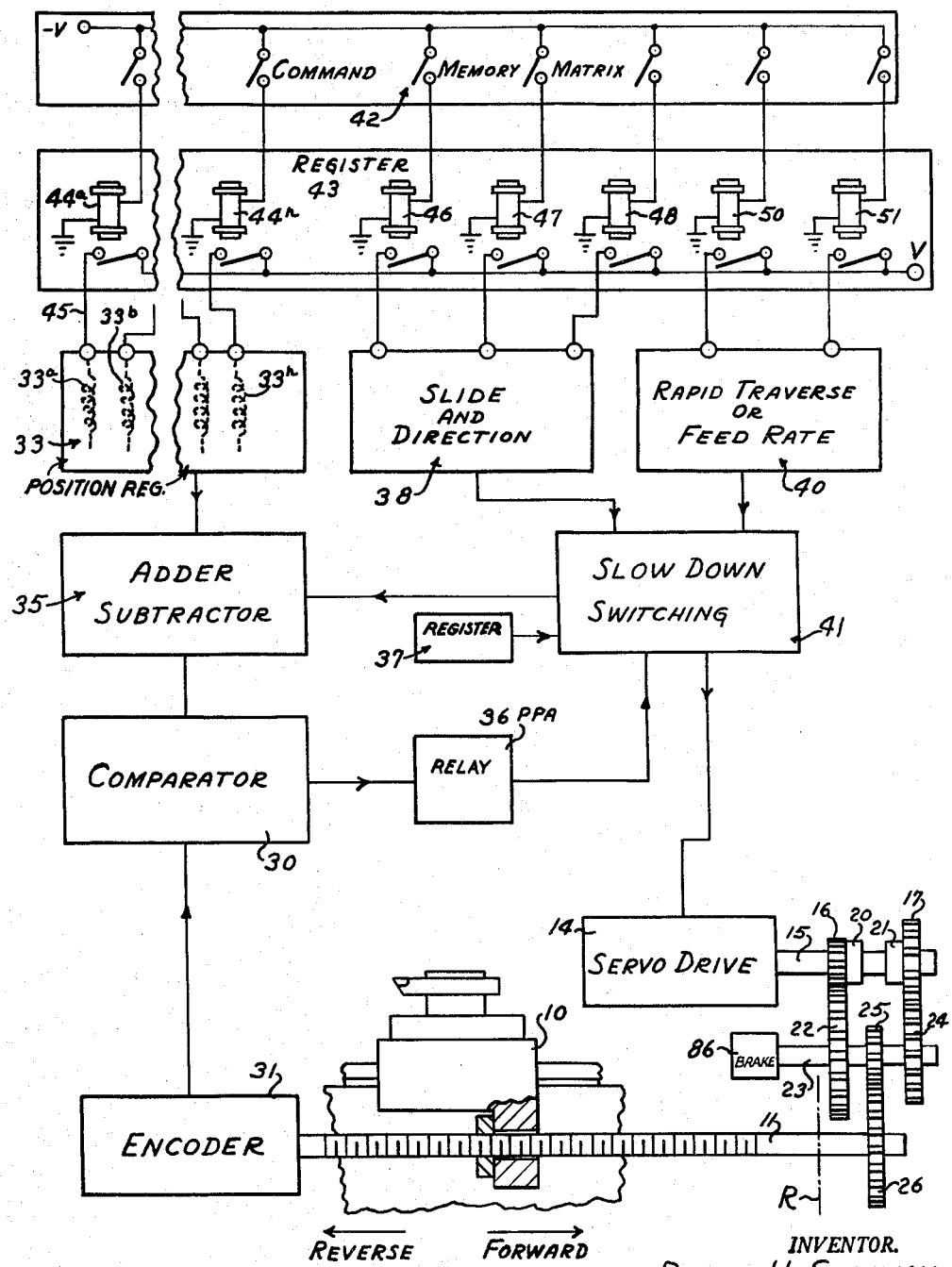
FIG. 1 is a block diagram of a system embodying the present invention.

A positioning system embodying the present invention is shown schematically in FIG. 1 of the drawings. Referring to FIG. 1, a slide 10, which may be the turret saddle of a turret lathe, is movable in either direction along a linear path of movement by rotation of a lead screw 11 operatively connected to the slide. The slide 10 will be considered as moving in a forward direction when moving to the right as viewed in FIG. 1 and in a reverse direction when moving to the left, and the various positions of the slide 10 along its path of reciprocation are each representable by a number indicating the distance of the position from a datum plane or reference position R at the right-hand end of its path of movement. As one proceeds to the left from the reference position R, the position numbers increase, and as one proceeds to the right toward the reference position R, the numbers decrease.

The lead screw 11 may be rotated at various rates of speed and is driven by a servodrive 14. The servodrive 14 has an output shaft 15 upon which gears 16, 17 are rotatably supported. The gears 16, 17 may be selectively connected to the shaft 15 for rotation therewith by engaging clutches 20, 21 for interconnecting the gears 16, 17, respectively, to the shaft 15. The gear 16 meshes with a gear 22 fixed to an intermediate shaft 23 and the gear 17, which is connected to the shaft 15 when the clutch 21 is engaged, meshes with a gear 24 also fixed to the shaft 23. It will be noted that the gear 16 is a smaller gear than the gear 17, when the gears are compared with their respective meshed gears, and therefore the drive to the shaft 23 is at one rate when the clutch 20 is engaged and is at a higher rate when the clutch 21 is engaged. The clutch 20 may be termed a feed clutch, while the clutch 21 may be termed a rapid traverse clutch. The shaft 23 is geared to the screw 11 by meshed gears 25, 26.

The servodrive 14 is a known type of phase-responsive servodrive and when an A.C. signal of one phase is applied thereto, the motor operates in one direction at a rate dependent on the magnitude of the signal, and when a signal of opposite phase is applied thereto, it operates in the opposite direction and at a rate dependent on the magnitude of the signal.

The servodrive 14 can be operated to position the slide at a predetermined position by control means including a comparator 30 which is adapted to compare an electrical manifestation representing the actual position of the slide 10 with an electrical manifestation representing the destination position to which the slide 10 is to be moved. In the illustrated embodiment, an encoder 31 is fixed to the lead screw 11 and provides bivalued electrical signals representing a binary number in digital form which indicates the actual displacement of the slide 10 from the reference position R and the number will change as the slide 10 is moved along the screw 11 so that the output of the encoder 31 always indicates the actual position of the slide 10. The output from the encoder 31 is applied to one input of the comparator. The electrical signals from the encoder 31 representing the position of the slide 10 are compared in the comparator with signals representing the destination for the slide 10 and received from a destination register 33. In the illustrated embodiment, the number set in the destination register 33 is preferably in digital form and is a binary number representing the destination position to which the slide 10 is to be moved. The number set in the destination register is modified by an increment in an adder-subtractor circuit 35 and is applied to a second input of the comparator 30 and is compared against the actual position number of the slide 10 received from the encoder. The comparator 30 will not presently be described in detail, since it is not per se a part of the present invention but, suffice it to say, the comparator 30 is capable of comparing the magnitudes of two binary numbers applied thereto and provides an output signal of one level when one of the numbers being compared, the actual position number in the instant case, is larger than or equal to the other number, and an ouput signal of a different level when the position number is smaller than the other number. Such a comparator circuit is described and claimed in my copending application Serial No. 23,742, filed April 21, 1960, and assigned to the same assignee as the present invention, and in that circuit, the output of the comparator is the same when the numbers are equal as when one number, the actual position number in the instant case, is larger than the other or destination number.

The output from the comparator 30 is utilized to control the energization and de-energization of a relay 36PPA and the relay 36PPA controls the energization and de-energization of the servodrive 14.

In the illustrated embodiment, when the destination number is smaller than the number from the encoder 31, the relay 36PPA is energized. In this case, the slide 10 must be moved in a forward direction to reach the destination. The relay 36PPA will remain energized as the slide moves forward until the slide crosses the destination position, at which time the relay will be de-energized.

If the destination number is larger than the number from the encoder 31, the relay 36PPA is, in the illustrated embodiment, de-energized. In this case, the servomotor 14 must be operated to move the slide 10 in a reverse direction to position the slide at the destination number and the relay 36PPA will remain de-energized until the slide arrives at the destination number, at which time the comparator 30 will operate to energize the relay 36PPA.

As will be explained in detail hereinafter, the system includes means for selecting the direction in which the slide is to be moved to accomplish the positioning and this selection effects the conditioning of circuits so that if the movement of the slide is to be in a forward direction, movement is initiated with relay 36PPA energized, and if the movement is to be in a reverse direction, the movement is initiated with relay 36PPA de-energized. It is to be understood, however, that the relay 36PPA is always actuated when the slide 10 reaches or crosses the destination position.

It should be noted that since the relay is energized, in the illustrated embodiment, when the actual position number is larger than the destination number, and when the numbers are equal, the relay will not be actuated when moving in a forward direction from an energized condition to a de-energized condition until the slide 10 has moved one digit beyond the desired destination. Consequently, when moving in a forward direction, the destination number set in the destination register is actually the number representing the desired destination minus 1. If desired, the circuit could be modified to automatically make this correction in response to the selection of the forward direction.

In accordance with one feature of the present invention, the relay 36PPA is also actuated when the slide 10 is moved to a position a predetermined distance from the destination during a positioning operation, and this actuation of the relay 36PPA is utilized to effect a slowdown of the slide if the slide is approaching the position at a rate higher than a crawl rate. The relay 36PPA is then actuated again when the destination position is reached to stop the movement of the slide.

The actuation of the relay 36PPA to effect the slowdown of the turret slide as it approaches its destination is accomplished, in the illustrated and preferred embodiment, by adding or subtracting an increment, which is representative of the distance from the destination at which slowdown is to occur, to the destination set in the register 33. If the slide is moving in the forward direction, the position at which slowdown is to occur will be a higher number position than that for the destination position and the increment is added to the destination stored in register 33. This addition is indicated as being done in the adder circuit 35 and the sum of the destination number and the increment is applied to the comparator to give a slowdown destination number. The output signal from the comparator will change when the slide 10 arrives at the slowdown position, and the relay 36PPA will be actuated to effect the slowdown of the turret slide and the removal of the increment. The removal of the increment will cause the comparator output to again change, since the destination number is now smaller than the actual position number and movement is continued to the destination position. When the slide 10 is being moved in a reverse direction to its position, the position at which slowdown is to be accomplished will have a lower corresponding number than the destination and it is necessary to subtract the increment from the destination number in order to obtain the slowdown position number. The number which represents the increment to be added to or subtracted from the destination number stored in the register 33 is set in a register 37 and shall hereinafter be termed the anticipate number.

In the illustrated and preferred embodiment, the direction of operation of the servodrive 14 is set in a control circuit 38 which determines both the direction of movement and whether or not the anticipate number is to be added or subtracted from the setting in destination register 33. Similarly, whether the motion is to be initially at a rapid traverse rate or at a feed rate is determined by the setting of a control circuit 40. The settings in the circuits 38, 40 control a switching circuit 41 which determines both whether or not the anticipate number is added to or subtracted from the destination number and the signal voltage which is applied to the servodrive 14 for effecting rotation of the lead screw 11.

In the illustrated embodiment, the destination register 33 and the circuits 38, 40 are set from a binary storage matrix 42 for storing a plurality of positioning commands. The storage matrix has associated therewith a read-out register 43 which is adapted to read out a selected command to be excuted and to temporarily store this command during execution. The read-out register 40 may be of various types but is shown as a relay read-out register having relays 44a . . . 44n for reading out the destination and relays 46, 47, 48, 50, 51 for reading out the slide direction and rate of motion. The relays in the register 43 are energized or de-energized in accordance with command settings in the storage matrix and control the settings of the destination register 33 and control circuits 38, 40. The relays of the relay register each have contacts which control the potential applied to a respective lead 45 which determines the condition of energization of a corresponding relay in the register 33 or control circuits 38, 40, as will appear in more detail hereinafter.

Figure 2:
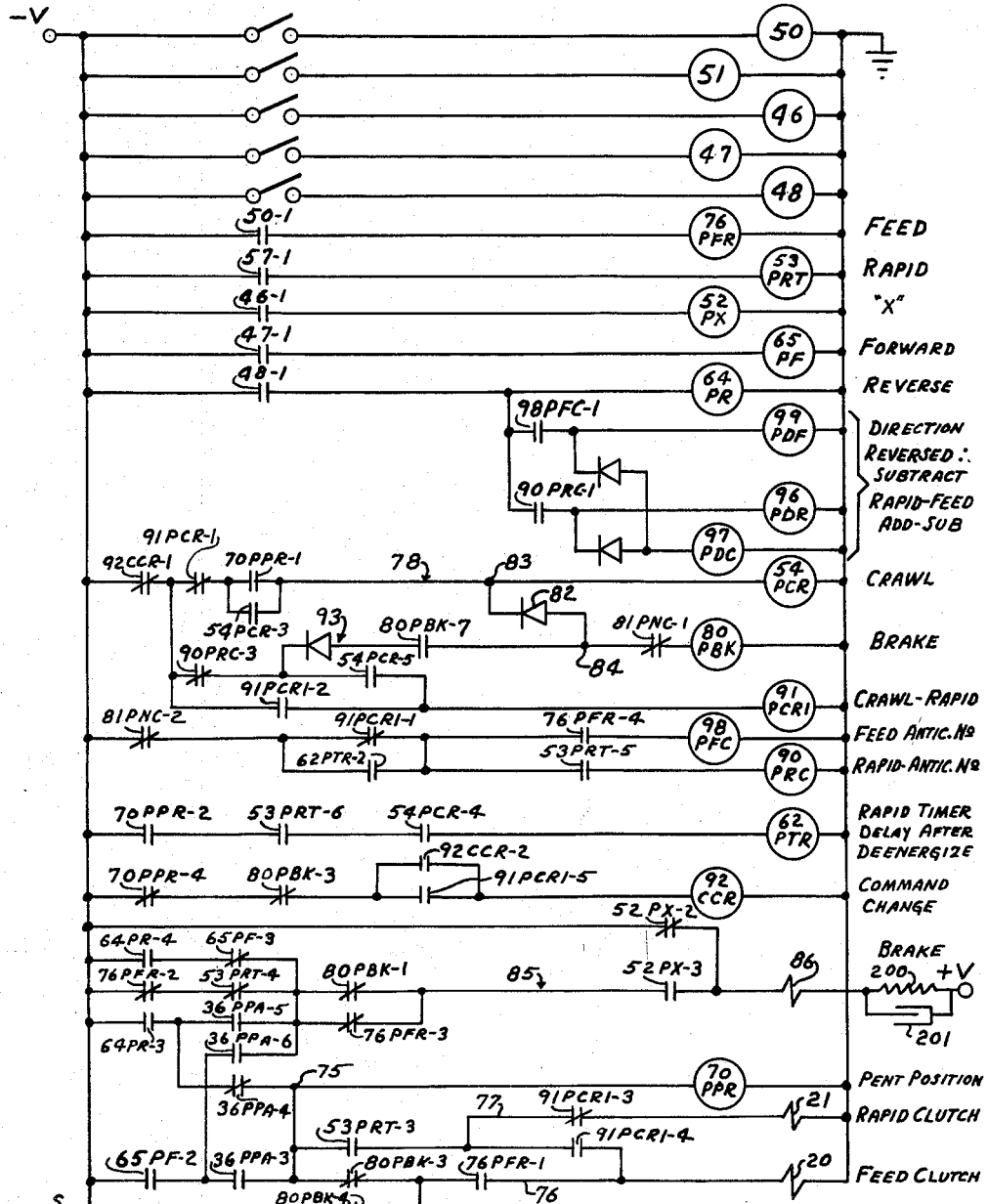
FIG. 2 is a simplified circuit diagram showing the controls and switching for the servodrive 14.

The operation of the present invention will be more completely understood by reference to FIG. 2 of the application, which is a simplified schematic diagram of an electrical control circuit embodying the present invention.

The storage register 43 includes the relay 46 which is energized when the servodrive 14 is to be operated to move the turret slide 10, the relay 47 which is to be energized when the motion is to be in a forward direction, the relay 48 which is energized when the motion is to be in a reverse direction, the relay 50 which is energized when the initial motion of the slide 10 is to be at a feed rate, and the relay 51 which is energized when the initial motion of the slide 10 is to be at a rapid traverse rate. The relays 46, 47, 48, 50 51 determine whether or not the servodrive 14 is to be operated for a given condition of energization of the relay 36PPA and control the energization of relays 53PRT and 54PCR for supplying in combination with the relay 36PPA a signal voltage to the servodrive 14 when the servodrive 14 is to be operated. The relays 46, 47, 48, 50, 51 have normally open contacts 46–1, 47–1, 48–1, 50–1 and 51–1 which, when closed, make circuits for respectively energizing relays 52PX, 65PF, 64PR, 76PFR and 53PRT.

The servodrive 14 is of the type, in the illustrated embodiment, which operates at a speed determined by the magnitude of the input signal applied thereto. In the disclosed system, a signal source S is provided for supplying input signals for the servodrive 14. The signal source S has three terminals 55, 56 and 57 which have thereon signals for effecting operation of the servodrive 14 at a feed rate, at a rapid traverse rate, and at crawl rate, the feed rate signal preferably being of a variable magnitude which is normally but not necessarily, intermediate the crawl and rapid traverse rate but preferably being adjustable to also provide a signal of small magnitude than the crawl signal. The various signals for the servodrive 14 are derived from dividing resistances 58 energized by one-half of the center-tapped secondary coil of a transformer 59 when the relay 64PR is energized and from the other half when the relay 64PR is de-energized to provide opposite phase signals for the energized and de-energized conditions of relay 64PR. The relay 64PR has contacts 64PR–a and 64PR–b in the connections between the transformer and the resistance 58 which control the phase of energization.

Referring to the lower portion of FIG. 2, it will be seen that the servodrive for moving the slide 10 can be supplied with the voltage at the feed terminal 55 or the rapid traverse terminal 56, or at the crawl terminal 57. Whether the voltage at the feed terminal 55 or the voltage at the rapid terminal 56 is connected to the servodrive 14 is determined by the condition of energization of the relay 53PRT. If the relay 53PRT is deenergized, the feed voltage is supplied to a junction 60 through normally closed contacts 53PRT–1 of the relay 53PRT. If the relay 53PRT is energized, the rapid traverse voltage is applied to the junction 60 through the now closed, normally open contacts 53PRT–2 of the relay 53PRT. The condition of relay 53PRT is determined by the condition of relay 51 of the register 45 which has normally open contacts 51–1 which effect the energization of relay 53PRT when energized. The voltage appearing at junction 60 of the signal circuit for the servomotor is applied to a junction 61 by normally open contacts 54PCR–1 if the relay 54PCR is energized. If, however, the relay 54PCR is de-energized, the crawl voltage appearing at the crawl terminal 57 is applied to the junction 61 through the normally closed contacts 62PTR–1 of a relay 62PTR, and the normally closed contacts 54PCR–2 of relay 54PCR. The voltage appearing at junction 61 may be connected to a junction 63 through either one of two parallel circuits connected between the junction 61 and the junction 63. The first parallel circuit is comprised of contacts 36PPA–1 of the relay 36PPA and normally open contacts 64PR–1 of a relay 64PR. The second parallel circuit for connecting the junction 61 to the junction 63 in the circuit for energizing the servodrive 14 includes normally open contacts 36PPA–2 of the relay 36PPA and normally open contacts 65PF–1 of the forward relay 65PF, and the normally closed interlocking contacts 64PR–2 of the relay 64PR. The junction 63 is connected to the servodrive 14 by the normally open contacts 52PX–1 of relay 52PX which is always energized by relay 46 in the register 43 when the slide 10 is being positioned.

It can now be seen that the condition of relay 54PCR determines whether the crawl voltage from terminal 57 is applied to the junction 61, or whether the feed or rapid traverse signal is applied to the junction 61, which one of the feed and rapid traverse signals that is applied to junction 61 being determined by whether the relay 53PRT is energized or de-energized. The signal appearing at the junction 61 is applied to the junction 63 through either one of two circuits, depending upon whether the forward relay 65PF is energized or the reverse relay 64PR is energized. If the forward relay 65PF is energized, the signal is applied to the junction 63 only when the relay 36PPA is energized and no voltage is applied when the relay 36PPA is de-energized. Conversely, the signal is applied to the junction 63 when the reverse relay 64PR is energized, only if the relay 36PPA is de-energized, and the circuit is broken if the relay 36PPA is energized. Consequently, the described circuitry is such that when the reverse relay 64PR is energized, the signal appearing at junction 61 will be applied to the servomotor to operate the latter when the relay 36PPA is de-energized, indicating that the turret slide 10 is to the right of the destination position. When the slide 10 is moved and reaches the destination position, the relay 36PPA is energized and the signal circuit is broken and the signal appearing at the junction 61 is no longer applied to the servodrive 14. Conversely, if the destination position is to the right of the slide 10 and the slide 10 must be moved in a forward direction, the relay 36PPA will be energized, since the immediate position number of the slide 10 is larger than the destination number, and the circuit through contacts 36PPA-2 and 65PF-1 to the servodrive 14 will be completed until the slide 10 arrives at its position and the relay 36PPA is actuated to its de-energized position breaking the circuit for energizing the servomotor 14.

As hereinbefore stated, the system is such that, when the slide 10 approaches its destination position, the speed of the slide 10 is changed to a crawl if not already at a crawl speed. As is apparent from the above-described portion of FIG. 2, it is necessary to effect the energization of relay 54PCR to effect the operation of the slide member 10 at either a feed or rapid traverse rate, and to effect the de-energization of the relay 54PCR when the slide 10 is to be operated at a crawl rate. The energization and de-energization of the relay 54PCR is controlled by a relay 70PPR. The relay 70PPR is energized and de-energized by the actuation of the relay 36PPA, and the circuits for energizing the relay 70PPR are such that the relay 70PPR is energized when the slide 10 is to be moved and is de-energized when the slide 10 is to be stopped. When the slide 10 is to be moved in a forward direction, the relay 70PPR is energizable through normally open contacts 65PF-2 of relay 65PF and normally open contacts 36PPA-3 of relay 36PPA connected in series with the relay 70PPR, with the contacts 65PF-2 being connected to the negative side of the power supply, and the contacts 65PF-2 and the contacts 36PPA-3 being connected between the negative side of the power supply and a junction 75, and the relay coil 70PPR being connected between the junction 75 and the positive side of the power supply. This means that the relay 70PPR will be energized when the slide 10 is at a position having a number higher than the number being supplied to the comparator 30, and will be de-energized to de-energize the relay 70PPR when the slide 10 arrives at the destination position.

A parallel circuit is connected between junction 75 and the negative side of the power supply to effect energization of the relay 70PPR when the slide 10 is to be moved in a reverse direction to its destination position. This circuit includes the normally open contacts 64PR-3 of relay 64PR connected to the negative side of the power supply, and the normally closed contacts 36PPA-4 of relay 36PPA connected between the contacts 64PR-3 and the junction 75. Consequently, when the relay 64PR-3 is energized, the junction 75 is connected to the negative side of the power supply when the relay 36PPA is de-energized to thereby effect the energization of relay 70PPR, and the junction 75 is disconnected when the contacts 36PPA-4 are opened upon the arrival of the slide 10 at the position by the energization of relay 36PPA.

From the foregoing, it can be seen that the junction 75 is connected to the negative side of the power supply when the slide 10 is to be moved and disconnected when the slide 10 is to be stopped. It will be noted from FIG. 2 that when the junction 75 is connected to the negative side of the power supply, either the clutch 20 or the clutch 21 is energized, depending upon whether the relay 53PRT is energized to select the rapid traverse clutch or whether the feed relay 76PFR is energized. The junction 75 is connected to energize the feed clutch 20 through a circuit 76 which includes the normally open contacts 76PFR-1 which are closed to effect the energization of the clutch when the relay 76PFR is energized. Similarly, if the rapid relay 53PRT is energized to select the rapid traverse rate, contacts 53PRT-3 are closed in a circuit 77 to make the circuit and energize the rapid traverse clutch 21 from the junction 75. Consequently, the selected one of the clutches is simultaneously energized with the energization of relay 70PPR.

The energization of the relay 70PPR closes contacts 70PPR-1 in a circuit 78 to effect the energization of the relay 54PCR to close its normally open contacts including contacts 54PCR-1, the latter contacts connecting the junction 61 in the signal circuit for the servodrive 14 to either the feed or the rapid traverse terminal as determined by the condition of rapid traverse relay 53PRT. Assuming that the forward relay coil 65PF has been energized, the voltage appearing at junction 61 will be applied to the servomotor 14 if the destination set in the comparator 30 has a smaller number than the position number supplied by the encoder 31, since, in this event, the relay 36PPA will be energized to close its normally open contacts 36PPA-2.

The energization of relay 54PCR also effects the closing of self-holding contacts 54PCR-3 connected across the contacts 70PPR-1 of relay 70PPR so that the opening of contacts 70PPR-1 will not effect the de-energization of relay 54PCR.

The closing of contacts 70PPR-1 also effects the energization of a relay 80PBK connected in parallel with the relay 54PCR by a circuit including normally closed contacts 81PNC-1 of a relay 81PNC (shown in the lower portion of FIG. 2) and a rectifier 82 which is poled to conduct current flowing from the relay coil 80PBK through the rectifier to the negative side of the power supply. The rectifier 82 is connected between a junction 83 in the circuit 78 for energizing the relay 54PCR and to one side of the contacts 81PNC-1. The energization of relay 80PBK opens normally closed contacts 80PBK-1 in a circuit 85 for energizing a brake 86 (see FIG. 1) in the drive for the slide 10. The brake 86 is normally energized by a circuit completed by normally closed contacts 52PX-2 of the selector relay 52PX, the relay 52PX also having normally open contacts 52PX-3 in the circuit 85 for energizing the brake 86. Consequently, the brake 86 is normally energized through the contacts 52PX-2 but, when the selector relay 52PX is energized, the circuit through the contacts 52PX-2 is broken but the circuit 85 through the contacts 52PX-3 is made, the circuit 85 also including the normally closed contacts 76PFR-2 and the contacts 53PRT-4 of relays 76PFR and 53PRT, respectively. Consequently, it will be seen that the brake 86 is applied whenever the selector relay 52PX is de-energized or if the relay 52PX is energized, whenever the feed relay 76PFR, the rapid relay 53PRT and the relay 80PBK are de-energized.

In the brake energizing circuit, the contacts 76PFR-2 and the contacts 53PRT-4 are paralleled by normally open contacts 64PR-4 of relay 64PR and normally closed contacts 65PF-3 of relay 65PF connected in series and also by a series circuit including the contacts 64PR-3 of reverse relay 64PR and normally open contacts 36PPA-5 of relay 36PPA and by a series circuit including the normally open contacts 65PF-2 of forward relay 65PF and normally closed contacts 36PPA-6. The contacts 80PBK-1 of relay 80PBK are connected in series with the described parallel circuits and between the circuits and the contacts 52PX-3 of the selector relay 52PX in the circuit 85 and are paralleled by normally closed contacts 76PFR-3 of relay 76PFR. The described circuitry will effect the energization of the brake 86 until a selection is made between the reverse relay 64PR and the forward relay 65PF, and between the feed relay 76PFR and the rapid traverse relay 53PRT to select both the direction and rate of initial feed. The parallel circuit including the contacts 65PF-2 of the forward relay 65PF and the normally closed contacts 36PPA-3 of the relay 36PPA and the circuit including the normally open contacts 64PR-3 of the reverse relay 64PR and the normally open contacts 36PPA-5 of the relay 36PPA are provided to effect energization of the brake when the slide 10 arrives at a slowdown position at a rapid traverse rate.

Assuming that the selector relay 52PX for selecting the slide 10 has been energized and that the rapid traverse rate of operation has been selected by effecting the energization of the rapid traverse relay coil 53PRT, and further assuming that the forward relay 65PF has been energized to select the forward direction of movement, the energization of relay 36PPA by the comparator 30 to indicate that the slide 10 must be moved in a forward direction to reach the destination registered in the comparator will effect a connection of the junction 75 to the negative side of the voltage supply to energize the relay 70PPR and to energize the rapid traverse clutch 21 through the now closed contacts 53PRT-3 of the relay 53PRT. The energization of the relay 70PPR also effects the energization of the relay 54PCR and the relay 80PBK by closing the contacts 70PPR-1 in the circuit for energizing these relays as described above. The energization of relay 54PCR completes the signal circuit from the signal source S to the servodrive 14 which was conditioned by the energization of the relay 36PPA to initiate movement of the slide 10 at a rapid traverse rate. It will be noted that the rapid traverse rate is selected because the rapid traverse relay 53PRT is energized opening its normally closed contacts 53PRT-1 connecting the junction 60 in the signal circuit to the feed terminal 55 and closing its contacts 53PRT-2 to connect the junction 60 to the rapid traverse terminal 56. The rapid traverse rate will, however, be terminated before reaching the destination position because the energization of the rapid traverse relay 53PRT also effects the energization of a relay coil 90PRC for adding an anticipate number to the destination number set in the destination register. The circuit for energizing relay 90PRC includes the normally open contacts 53PRT-5 of relay 53PRT which, when closed, make a circuit from the negative side of the voltage supply to the relay coil 90PRC through the normally closed contacts 81PNC-2 of the relay 81PNC, and the normally closed contacts 91PCR1-1 of a relay 91PCR1. The contacts 91PCR1-1 are also paralleled by normally open contacts 62PTR-2 of relay 62PTR. It should be noted that the relay 62PTR is picked up upon the energization of relay 70PPR because of the closing of contacts 70PPR-2 in the circuit for energizing relay 62PTR provided the rapid traverse relay 53PRT selecting the rapid rate of movement and the relay 54PCR are energized, these relays having normally open contacts 54PCR-4 and 53PRT-6 in the circuit for energizing relay 62PTR. When the slide 10 arrives at the position which is the sum of the destination number and the anticipate number, the relay 36PPA will be de-energized to break the signal circuit for servomotor 14 from the junction 61 through the normally open contacts 36PPA-2 and the normally open contacts 65PF-1 to disconnect the input signal to the servodrive 14. The de-energization of relay 36PPA also effects the de-energization of relay 70PPR by opening its contacts 36PPA-3 which were maintaining the relay 70PPR energized by connecting the junction 75 to the negative side of the power supply. The opening of these contacts 36PPA-3 also breaks the circuit including the normally open contacts 53PRT-3 for energizing the rapid traverse clutch 21 to effect a de-energization of the latter. The de-energization of the relay 36PPA also closes its contacts 36PPA-6 to make the circuit for energizing the brake 86 which includes the contacts 65PF-2, now closed, of relay 65PF, the normally closed contacts 36PPA-6 and normally closed contacts 76PFR-3 of relay 76PFR, the relay 65PF being the now energized forward relay and the relay 76PFR being the feed relay and de-energized when the rapid relay 53PRT is energized. Consequently, the de-energization of the relay 36PPA disengages the rapid clutch 21 and applies the brake 86.

In addition to the foregoing, the de-energization of the relay 70PPR upon the opening of the contacts 36PPA-3 opens its contacts 70PPR-1 in the circuit for energizing relay 54PCR. This relay, however, is maintained energized by its holding contacts 54PCR-3. However, the relay 70PPR also has normally closed contacts 70PPR-3 which make, when the relay 54PCR is energized, a circuit for energizing the relay 91PCR1. The circuit made by the now closed contacts 70PPR-3 includes the normally closed contacts 92CCR-1 of a relay 92CCR, the contacts 70PPR-3, and the normally open contacts 54PCR-5 of relay 54PCR, which are now closed. The contacts 70PPR-3 and the contacts 54PCR-5 are paralleled by holding contacts 91PCR1-2 of relay 91PCR1 so that the relay is maintained energized independently of the operation of relay 70PPR and the relay 54PCR. The energization of the relay 91PCR1 opens its normally closed contacts 91PCR1-3 in the circuit for energizing the relay 54PCR and the relay 80PBK. This deenergizes the relay 54PCR but the relay 80PBK is not de-energized since it is maintained energized through a holding circuit 93 including the now closed contacts 70PPR-3, the contacts 92CCR-1, and the normally open holding contacts 80PBK-7 and the holding circuit connecting the junction 84 to the negative side of the power supply. Since the relays 70PPR and 54PCR are de-energized, the circuit for maintaining relay 62PTR energized is broken. It will be noted that the relay 62PTR has been, through its normally open contacts 62PTR-2, maintaining a circuit for energizing relay 90PRC independently of normally closed contacts 91PCR1-1 which are opened by the energization of relay 91PCR1, the contacts 62PTR-2 being connected in parallel with the normally closed contacts 91PCR1-1. Therefore, when the relay 62PTR is de-energized, the contacts 62PTR-2 will open to de-energize the relay 90PRC and the de-energization of this relay removes the anticipate number from the adding circuit. When this is done, the destination set in the comparator will be increased by the magnitude of the anticipate number and coincidence will no longer be indicated by the comparator circuit and the relay 36PPA will again be energized to connect the junction 75 to the negative side of the power supply through the contacts 65PF-2 and the contacts 36PPA-3 to energize the relay 70PPA and effect energization of the feed clutch 20. The energization of the relay 36PPA will also open its contacts 36PPA-6 to de-energize the brake 86 to allow the servomotor to drive the slide 10 and closes its contacts 36PPA-2 in the signal circuit for the servodrive 14 to connect the drive to the crawl terminal 57. The slide 10 will now be driven forward at a crawl rate.

It will be noted that the feed clutch is now energized by the re-energization of relay 36PPA since the relay 91PCR1, which has been energized as described above, completes a circuit from the junction 75 through the normally open contacts 53PRT-3 of the rapid traverse relay, now energized, and contacts 91PCR1-4 of relay 91PCR1 to energize the feed clutch 20. Moreover, although the energization of relay 70PPR also opens the normally closed contacts 70PPR-3 in the circuits for maintaining the relay 80PBK and the relay 91PCR1 energized, the relay 91PCR1 will be maintained energized by its holding contacts 91PCR1-2. Furthermore, the re-energization of relay 70PPR will not effect the energization of relay 54PCR since the contacts 91PCR1–3 in that circuit are open.

It will be noted that when the relay 54PCR was de-energized by arrival at the slowdown position, its normally closed contacts 54PCR–2 in the circuit from the crawl terminal 57 through normally closed contacts 62PTR–1 to the junction 61 were closed to apply a crawl voltage to the junction 61 and the relay contacts 54PCR–1 were opened to disconnect the rapid traverse terminal 56 from the junction 61. However, the crawl signal at terminal 57 is not applied to the terminal 61 until the relay 62PTR is de-energized in response to the opening of the contacts 70PPR–2 or the contacts 54PCR–4 effected when the relay 70PPR was de-energized by arrival at the slowdown position. The relay 62PTR is a time delay relay which has a time delay between its de-energization and drop-out times and this delay assures that the crawl signal is not applied until the brake 86 has stopped the slide and has been released and the feed clutch engaged. When, however, the dropping out of the relay 62PTR takes place, the crawl voltage is applied and the anticipate number is removed by the opening of contacts 62PTR–2 in the circuit energizing relay 90PRC and the servomotor 14 operates to advance the slide 10.

When coincidence is again indicated by the comparator circuit, the relay 36PPA will again be de-energized to break the circuit from the junction 61 to the servomotor 14 to disconnect the crawl voltage from the motor. The de-energization of relay 36PPA also again effects the de-energization of the relay 70PPR to close its normally closed contacts 70PPR–4 in a circuit for energizing the relay 92CCR. The circuit for energizing the relay 92CCR also includes the normally closed contacts 80PBK–3 of relay 80PBK, de-energized on re-energization of relay 36PPA after slowdown, and the normally open contacts 91PCR1–5 which are closed since the relay 91PCR1 is presently energized. When the relay 92CCR is energized, its contacts 92CCR–1 in the circuit for maintaining the relay 91PCR1 energized are opened to de-energize this relay and open contacts 91PCR1–4 in the circuit for energizing the clutch 20. The clutch 20, however, has already been de-energized by the operation of the contacts 36PPA–3 to effect the disconnection of junction 75 from the negative side of the power supply.

The energization of the relay 92CCR then effects the de-energization of the relay 91PCR1 which is the only other relay, excepting the selector relays set by the readout register, energized in the control circuit at this time and conditions the circuit for another positioning cycle. The relay 92CCR has contacts 92CCR–2 in parallel with the contacts 91PCR1–5 which hold the relay 92CCR energized until the relay 70PPR is again picked up and contacts 70PPR–4 opened to indicate the positioning cycle is to again be repeated.

The foregoing has described the manner in which the disclosed circuit operates to move the slide 10 at a rapid traverse rate in a forward direction toward a destination position and to effect a stopping of the slide member at an anticipate position in advance of the destination position, the disengagement of the rapid traverse drive and the engagement of a crawl drive to finally position the slide 10 at the destination position.

If the destination position is at a higher position than the immediate position of the slide, the slide must be moved in a reverse direction and when the destination is compared with the actual position of the slide, the relay will be de-energized since the destination number will be larger than the number of the encoder. The energization of the relay 64PR to select the reverse operation of the slide 10 conditions the control circuit so that the de-energized condition of the relay 36PPA effects the movement of the slide in the same manner that the energized condition would for forward operation and stops the movement when the relay 36PPA is de-energized. The energization of the relay 64PR operates its contacts 64PR–a and 64PR–b to reverse the phase of energization of resistance dividers 58 and closes its contacts 64PR–1 which are connected to the junction 61 in the circuit for applying the signal voltage to the servomotor through the normally closed contacts 36PPA–1 so that the signal from the junction 61 is now applied to the servodrive when the relay 36PPA–1 is de-energized. Similarly, the energization of relay 64PR closes its contacts 64PR–3 in the circuit between the junction 75, from which the relay 70PPR is energized, and the negative side of the power supply, and including the normally closed contacts 36PPA–4 so that the relay 70PPR is now energized when the relay 36PPA is de-energized, and vice versa.

Inasmuch as the relay 70PPR is once again energized when the comparator is indicating that the slide must be moved in a reverse direction to position and de-energize on arrival at the position, the remainder of the circuitry will operate in the same manner as described for the forward direction to effect the movement of the slide 10, the application of the brake 86, the energization and de-energization of the clutch 21, and the energization and de-energization of the clutch 20 to position the slide 10 at the destination; but there is one further exception in the mode of operation. When the slide 10 is moving in a reverse direction toward the destination position, the anticipate number must be subtracted from the destination number to stop the slide and change from rapid traverse to crawl in advance of the position. To this end, the energization of relay 64PR by the closing of the contacts 48–1 of relay 48 also completes a circuit for energizing relays 96PDR and 97PDC connected in parallel with the relay 64PR provided the rapid traverse anticipate relay 90PRC is energized. The relay 90PRC has normally open contacts 90PRC–1 connecting the relays 96PDR and 97PDC in parallel with the relay 64PR. The energization of the relays 96PDR and 97 PDC effects the adding circuit in such a manner that the anticipate number is now subtracted from the destination number. The relay 90PRC is de-energized when the anticipate number is to be removed from the destination number in the manner described above and this will also effect the de-energization of the relays 96PDR and 97PDC.

When the initial movement of the slide 10 to a position is to be at a feed rate, the feed relay 76PFR is energized rather than the rapid relay 53PRT. Since the relay 53PRT is de-energized, the feed terminal 55 will be connected to the junction 61 to supply the feed voltage to the servodrive 14 rather than the rapid traverse voltage, and the rapid traverse clutch 21 will not be energized in response to the connection of the junction 75 to the negative side of the voltage supply when the relay 36PPA indicates movement in the selected direction since the contacts 53PRT–3 and the contacts 91PCR1–4 are open. A circuit, however, will be made by the closing of contacts 76PFR–1 of relay 76PFR in a circuit connected between the junction 75 and the feed clutch 20 to effect energization of the latter when junction 75 is connected to the negative side of the power supply. This circuit includes the normally closed contacts 80PBK–3 of the relay 80PBK. The relay 80PBK also has normally open holding contacts 80PBK–4 which provide a circuit for energizing the clutch 20 through the contact 76PFR–1. It will be seen, therefore, that the feed clutch 20 is immediately energized through contacts 80PBK–3 when the relay 36PPA is actuated to connect junction 75 to the negative side of the power supply to energize the relay 70PPR and, when the relay 70PPR operates to pick up the relay 80PBK in the manner described above and open contacts 80PBK–3, the circuit to the feed clutch 20 will be maintained through the circuit provided by the contacts 80PBK–4 and the contacts 76PFR–1. This latter circuit will be maintained until the relay 80PBK is de-energized and it will be recalled that the relay 80PBK is de-energized when the relay 70PPR is re-energized after reaching slowdown and the removal of the anticipate number. The re-energization of relay 70PPR, however, connects the junction 75 to the negative side of the power supply so that the clutch 20 is maintained energized through the contacts 80PBK–3 on de-energization of relay 80PBK to open contacts 80PBK–4 in response to the re-energization of relay 70PPR.

Preferably, when the slide is initially moved at a feed rate, the anticipate number which is added to or subtracted from the destination is a smaller number than in the case of when the initial movement is at a rapid traverse rate. To this end, the rapid anticipate relay 90PRC and the contacts 53PRT–5 are paralleled by a circuit which includes the normally open contacts 76PFR–4 of the feed relay 76PFR and a relay 98PFC. The relay 98PFC will be energized in the same manner described for the relay 90PRC when the relay 76PFR is energized rather than the rapid traverse relay 53PRT to provide the anticipate number and this anticipate number will be removed from the circuit when the relay 91PCR1 is energized upon the arrival of the slide at the anticipate position. The manner in which the relay 91PCR1 is energized upon the arrival of the slide is the same manner as described with reference to the rapid traverse operation. Since it is not necessary to stop between feed and crawl and it is not necessary to shift from the rapid traverse clutch to the feed clutch, it is not necessary to apply the brake 86 when the anticipate position is reached and the circuit which was effective to apply the brake at this point is rendered ineffective by the opening of contacts 76PFR–3 in the circuit for energizing the brake 86. It will be noted that a brake-energizing circuit cannot be made through the contacts 80PBK–1 when the slide arrives at the anticipate position since this relay is not dropped out until the relay 36PPA is again actuated upon the removal of the anticipate number to initiate continued movement toward the final position.

When the relay 80PBK is energized and the relay 62PTR de-energized, as is the case when the initial operation is at a feed rate since the relay 62PTR is never picked up, the crawl voltage from the terminal 57 is connected through the normally closed contacts 62PTR–1 of relay 62PTR and through the normally open contacts 80PBK–4 to a junction 100, which junction is, in turn, connected to a point between the contacts 36PPA–2 and the contacts 65PF–1 by normally closed contacts 36PPA–6 and to a junction between the contacts 36PPA–1 and contacts 64PR–1 by the normally open contacts 36PPA–7. This means that the crawl voltage appearing at terminal 57 is applied to the servodrive 14 when the relay 36PPA is de-energized provided the contacts 65PF–1 are closed, which is true when the relay 65PF is actuated to select operation in a forward direction, and is applied to the servodrive 14 when the relay 36PPA is energized provided the relay 64PR is energized to close its contacts 64PR–1. It will be recalled that when the forward direction for the slide 10 is selected, the de-energized condition of relay 36PPA is effected when the slide 10 has moved to the anticipate or final position. As the slide 10 moves to the anticipate position, the relay 80PBK is energized, as described above, and the relay is not de-energized until the relay 70PPR is re-energized after the removal of the anticipate number. Accordingly, the crawl voltage will be applied through the normally open contacts 80PBK–4 and the normally closed contacts 36PPA–6 and through the normally open contacts 65PF–1 to the servodrive 14 immediately when the relay 36PPA is de-energized upon reaching the anticipate position. Similarly, the crawl voltage will be immediately applied to the servodrive 14 through contacts 36PPA–7 and contacts 64PR–1 when the operation is in the reverse direction and the relay 36PPA is energized as the slide 10 reaches the anticipate position. Accordingly, during feed operation, the crawl signal is immediately applied upon the reaching of the anticipate position when the relay 36PPA is actuated to its condition signifying arrival at the anticipate position. When the relay 16PPA is again actuated upon the removal of the anticipate number and relay 54PCR energized, the crawl signal will be applied to the junction 61 through the circuit completed by the contacts 54PCR–2 and the contacts 62PTR–1 to maintain the application of the crawl signal to the servodrive even though the relay 80PBK is de-energized. The crawl signal will then be disconnected from the servodrive 14 when the relay 36PPA is again actuated upon the arrival of the slide 10 at the destination position.

When the operation of the slide 10 is to be in a reverse direction at a feed rate to effect the positioning of the slide, it is necessary to subtract the anticipate number introduced by the energization of relay 98PFC. To this end, the relay 97PDC and a relay 99PDF are energized when the reverse selector relay 64PR is energized by energizing relay 48 and the feed anticipate number relay 98PFC is energized in response to the selection of the feed rate. The relay 98PFC has normally open contacts 98PFC–1 which, when closed, make circuits between the contacts 48–1 and the relay coils 99PDF, 97PDC to effect energization of the relays when both the contacts 48–1 and the contacts 98PFC–1 are closed. The circuits will be broken when the slide arrives at the anticipate position and the relay 98PFC de-energized in response to the energization of relay 91PCR1.

Preferably, the feed signal appearing at feed terminal 55 is a variable signal and can be varried to a magnitude which is smaller than the crawl signal on terminal 57. If the feed signal is smaller than the crawl signal, it is not necessary to add an anticipate number to the destination number to effect a slowdown, since the crawl rate would actually be higher than the feed rate. Accordingly, a no-crawl detector N is connected between the junction 60 and the crawl terminal 57 and compares the signals appearing at the terminal and the junction and if the signal at the junction 60 is smaller than the signal at the terminal 57, the relay 81PNC is actuated. The relay 81PNC has normally closed contacts 81PNC–1 in the circuit for energizing the relay 80PBK which, when opened, prevent the energization of this relay. The relay 81PNC also has contacts 81PNC–2 in the circuits for energizing the selected one of the relays 98PFC and 90PRC and when the contacts 81PNC–2 are open, these relays cannot be energized. Since the relay 80PBK is never energized when relay 81PNC is energized, the contacts 80PBK–1 in the circuit for energizing the brake 86 are closed and the brake will be applied by energization through the circuit including the contacts 65PF–2 and the contacts 36PPA–6, or through the circuit including the contacts 64PR–3 and the contacts 36PPA–5 whenever the slide reaches a position indicating arrival at a destination position and the relay 36PPA is actuated. The operation of these circuits has been described in detail above and will not be repeated.

The operation of the system when the voltage at the feed terminal 55 is less than the voltage at the crawl terminal 57 will now be briefly described for positioning in a forward direction. When the positioning is to occur in the forward direction at the feed rate which is, in the assumed case, less than the crawl signal, the forward relay 65PF, the slide selector relay 52PX and the feed selector relay 76PFR are energized by the memory. In a case where the positioning is to be by moving the slide 10 in a forward direction, the position number from the encoder 31 is larger than the destination number and, therefore, the relay 36PPA will be energized by the comparator 30 until the slide 10 is moved to the destination position. The energization of the relay 36PPA will effect energization of the relay 70PPR through the contacts 65PF–2 to pick up the relay 54PCR and connect the junction 61 in the signal circuit to the feed terminal 55. The crawl detector will operate relay 81PNC to prevent the relay 80PBK from being picked up and will open contacts 81PNC-2 to prevent the energization of relay 98PFC to introduce the anticipate number. Accordingly, the comparator 30 will actually be comparing for the entire movement of the slide 10 the number from the encoder 31 with the destination number, and the relay 36PPA will not be actuated to its de-energized position until the slide 10 arrives at the final destination. When the slide 10 arrives at the final destination, de-energization of the relay 36PPA will break the circuit energizing the relay 70PPR and the feed clutch 20 to stop the operation of the motor, and when the relay 36PPA is de-energized, the brake 86 will be applied through the contacts 65PF-2, the contacts 36PPA-6 and the contacts 80PBK-1. It will be noted that during the operation when the feed signal is less than the crawl signal, the clutch 20 is energized from the junction 75 through the normally closed contacts 80PBK-3 of the relay 80PBK and the normally open contacts 76PFR-1 of the relay 76PFR, and that the feed clutch 20 is, therefore, energized and de-energized simultaneously with the relay 70PPR by the actuation of the relay 36PPA.

In summary, it can be said that the relays 76PFR, 53PRT, 65PF and 64PR are selectively energized to select operation at a feed rate, operation at a rapid traverse rate, forward operation and reverse operation, respectively. The energization of forward relay 65PF conditions the circuitry to effect operation in response to the energization of relay 36PPA operated by the comparator and energization of reverse relay 64PR conditions the circuit to effect operation in response to the de-energization of the relay 36PPA. The energization of one of the relays 76PFR and 53PRT selects the initial rate of operation at a feed rate and rapid rate, respectively, and conditions the circuits to modify the destination number by a predetermined increment in response to the actuation of relay 36PPA to the condition indicating movement in the selected direction. The relays 65PF and 64PR determine whether the increment is added to or subtracted from the destination number. When the relay 36PPA is initially actuated to effect movement, a circuit is conditioned to energize relay 91PCR1 when the relay 36PPA is operated to indicate arrival at the anticipate position to remove modification from the destination number and to condition the circuit for operation at a crawl rate after the removal of the increment. If the feed rate is lower than the crawl rate and initial operation at the feed rate selected, the relay 81PNC is operated to prevent the addition of an increment to the destination position.

Figure 2A:
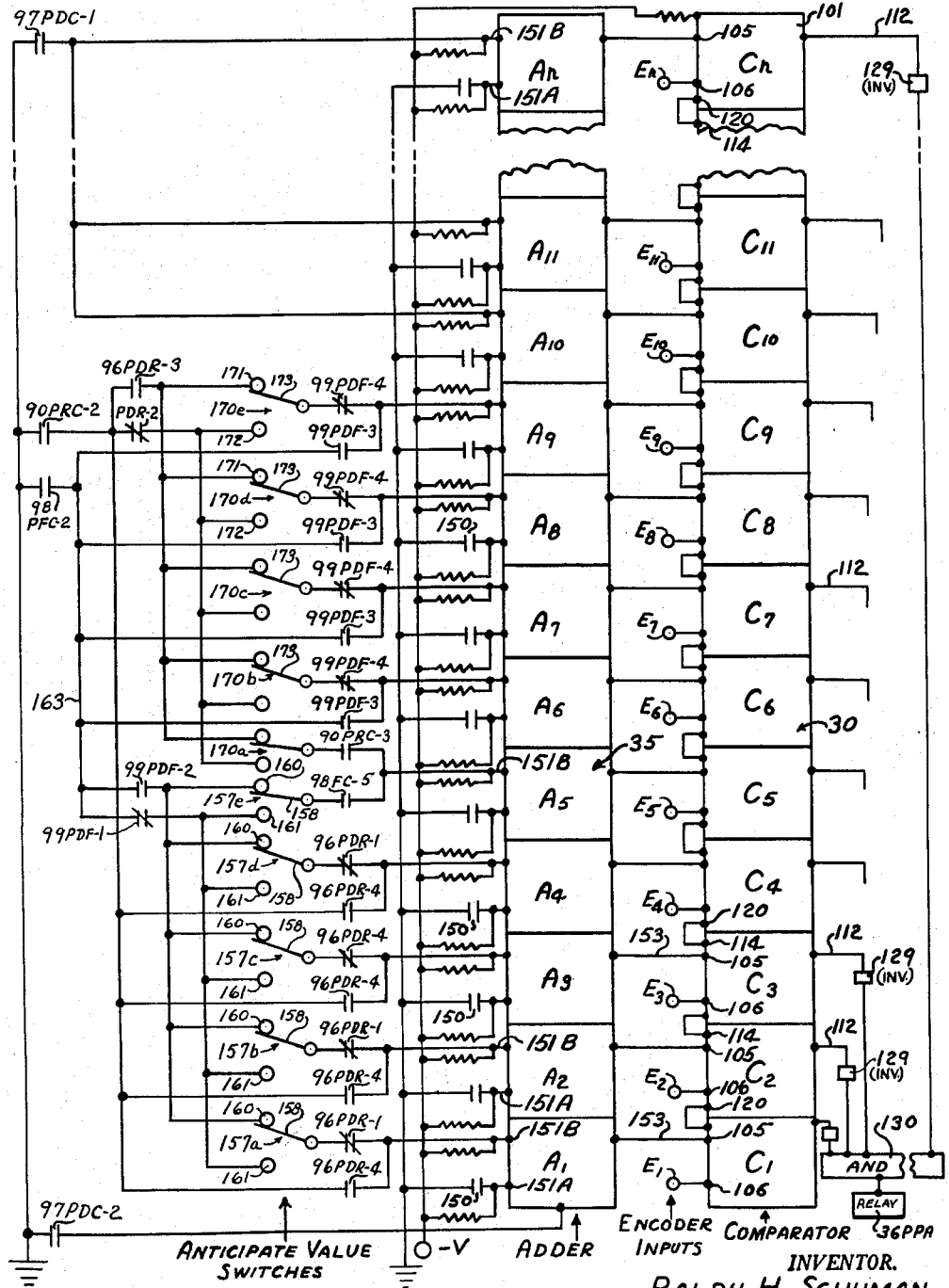
FIG. 2A is a circuit and logic diagram of an adder and subtractor which may be used in the system of FIG. 1.

Thus far, the adder-subtractor 35 has not been described in detail since various circuits might be utilized to effect the algebraic operation to modify the destination number to provide a change-speed position number. The preferred adder-subtractor 35, together with the preferred form of the comparator 30, is illustrated logically in FIG. 2A. Referring to FIG. 2A, it will be seen that the comparator 30 comprises a comparator for comparing two numbers having N binary digits. The comparator has stages $C_1, C_2 \ldots C_n$ for comparing the respective digits of the numbers, with the least significant binary digits of the numbers being compared in the comparator stage $C_1$, the next more significant binary digit in the stage $C_2$, etc.

Each of the comparator stages is substantially identical and a comparator stage suitable for use in the present invention is shown in FIG. 3. In the description, it will be assumed that the comparator is comparing a binary number D representing the destination and a binary number E representing the actual position, each number having N digits, with the digit of the number being designated by the character corresponding to the number and a subscript indicating the significant place of the digit. The least significant digit is identified by the subscript 1, the next more significant digit by the subscript 2, etc. It will be further assumed that the stage of the comparator shown in FIG. 3 is the stage for comparing the digits $D_3$ and $E_3$. It will be further assumed that when a digit has the binary value 0, the digit is represented by a low voltage, and when it has the binary value 1, the digit is represented by a high voltage. Referring to FIG. 3, the digit $D_3$ is applied to a terminal 105 of the comparator stage $C_3$ and the digit $E_3$ is applied to a terminal 106 of the comparator stage $C_3$. The terminal 105 and the terminal 106 are connected by connections 107, 108, respectively, to two inputs of a three-input AND gate 110. The connection 108 is connected to terminal 106 by an inverter 111 so that the digit value $E_3$ is inverted before it is applied to the gate. In other words, when the digit $E_3$ is 0, a high voltage is applied to the gate 110, and when the digit $E_3$ is 1, a low voltage is applied to the gate 110. It will be appreciated by those skilled in the art, that the gate 110 has a low output on an output connection 112 unless all of the inputs to the gate are at a high level, in which case the output connection 112 is at a high level. The gate 110 has a third input to which a connection 113 is connected and the connection 113 is controlled by the magnitude of a binary valued signal being applied to an input terminal 114 of the comparator stage. The signal has low and high values represented by 0 and 1. The input terminal 114 is connected to an inverter circuit 116 which has its output appearing on an output connection 117 that is connected to the connection 113. Accordingly, the connection 113 to the gate 110 is at a high level whenever the binary signal applied to the input terminal 114 is 0, since the inverter 116 will invert this to provide a high level output on connection 117.

It can now be seen that whenever the digits $D_3$ and $E_3$ are equal, one of the connections 107, 108 will be at a low level because of the inverter 111 and the gate 110 will have a low level output on its connection 112. In only one condition are both the connections 107, 108 at a high level and that is when the digit $D_3$ is 1 and the digit $E_3$ is 0. In this case, there will be a high level on each of the connections 107, 108 (on connection 108 because of inverter 111) and the output of the AND gate 110 on connection 112 will also be at a high level provided the connection 113 is at a high level. The connection 113 will be at a high level as long as the input terminal 114 has a low level voltage, i.e. a (0), applied thereto, which is the case when the comparator stage is effective to compare the digits. If, however, a high voltage, i.e. a (1), is applied to the input terminal 114, the connection 113 will be at a low level and regardless of the digits being applied to the input terminals 105, 106, the gate 110 cannot be operated and the output connection 112 will have a low level voltage thereon.

The comparator stage also has an output terminal 120 which has a low level voltage appearing thereon for all conditions of the circuit, except when the digit $E_3$ is larger than the digit $D_3$. It will be noted that the output connection 117 from the inverter circuit 116 is applied to respective inputs of two AND gates 122, 123, each having two inputs with the other input of the gate 122 being connected to the terminal 105 and the other input of the gate 123 being connected to the output of the inverter 111, i.e. the connection 108. The gates 122, 123, which have output connections 124, 125, respectively, connected to the inputs of an OR gate 126, will provide a high level output on their respective output connections when the input connected to the connection 117 is at a high level, i.e. when a (0) is applied to terminal 114, and when the other input of the gate is at a high level. As stated above, the connection 117 is normally at a high level when the stage is effective to compare the digits and, therefore, a high level output will appear on the output of gate 122 when the digit $D_3$ is a 1. The corresponding high output from OR gate 126 will be inverted by an inverter and amplifier 127 connecting the output of the OR gate 126 to the terminal 120 and the level at the terminal 120 will be a low level. Similarly, with the connection 117 at its high level, the gate 123 will have a high level output when the digit $E_3$ is 0, since this is when the connection 108 has a high level due to the inverter 111. Consequently, it can be seen that the terminal 120 will be at a low level for a high level condition of conductor 117 when the digit $D_3$ is 1, or when the digit $E_3$ is 0. The only possible condition at terminals 105, 106 where the digit $D_3$ is not 1 or the digit $E_3$ is not 0 is when the digit $E_3$ is 1 and the digit $D_3$ is 0. In this condition, neither of the gates will be conditioned to have a high level output even though the connection 117 is at a high level and the outputs of the gates 122, 123 will be at a low level and the terminal 120 will be at a high level due to the operation of the inverter 127 and this signifies that $E_3$ is larger than $D_3$ since a high level output at terminal 120 will occur only under this condition when connection 117 is at a high level. It will be noted that if a high level voltage is applied to the input terminal 114, then the gates 122, 123 will have one input thereof maintained at a low level and, consequently, can never be operated by the digits appearing on the terminals 105, 106 and, therefore, the inputs to the OR gate will always be at a low level and the output of the OR gate will be inverted to provide a high level voltage at the terminal 120.

In the comparator 30, the output terminal 120 of each stage is connected to the input terminal 114 of the next least significant stage so that a low voltage is applied to the input terminal 114 of the next least significant stage as long as the particular stage does not indicate that the E digit being applied thereto is larger than the corresponding D digit. If this latter condition does occur, the voltage at the output terminal of the particular stage, $C_3$ in the case under discussion, will be at a positive or high level raising the voltage of the input terminal 114 of the stage $C_2$ to lower the voltage level of the connection 117 of the stage $C_2$ to prevent the output of the gate 110 from rising to its high level and to establish a high voltage on the output terminal 120 of the stage $C_2$ to, in turn, effect the corresponding conditions in stage $C_1$. Consequently, when one stage signifies that the E digit in that stage is larger than the D digit, all outputs from the gates 110 of the lesser significant stages are made 0, i.e. a low level, and all terminals 120 thereof are at a high level.

The outputs 112 of the comparator stages are each inverted by an inverter 129 and are connected to a respective input of an AND gate 130, which has its output connected to energize the relay 36PPA. Accordingly, the relay 36PPA will not be energized unless all of the gates 110 have low level outputs on the connection 112. As explained above, a low level output of gate 110 will occur when the particular stage indicates that the digit E being compared therein is larger than the digit D, or when such a comparison has been determined by a preceding stage, since, in that case, the preceding stage will have applied a high level voltage to the input terminal 114 of all the following stages to effect a lowering of the voltage on the connection 113 to maintain the gate 110 in its unactuated condition with a low level on the output connection 112. It will be noted that the output of the gates 110 of any stage is also down when the D and E digits being compared are equal. Thus, if the stages more significant than a stage $C_x$ which is indicating an E digit larger than the D digit have digits which are equal, the outputs from these gates will be down as well as the outputs from stage $C_x$ and the lesser significant stages due to the high voltage on terminal 120 of stage $C_x$ and gate 130 will operate. It will be noted that in the absence of the control provided by the voltage at terminal 120, a stage less significant than stage $C_x$ might give a signal that the D digit therein was larger to raise the output at gate 110 and thus prevent the gate 130 from operating even though stage $C_x$ had determined that $E_x$ was larger than $D_x$ and that the gate 130 should operate.

When the number E is larger than the number D, the most significant stage indicating this will have an output which is up and, therefore, one of the outputs of the gate 130 will be down and the relay 36PPA will be de-energized.

Accordingly, it can be seen that the comparator 30 operates to energize the relay 36PPA whenever the number from the encoder is greater than or equal to the destination number and to de-energize the relay when the destination number is the larger.

The destination number representing the final destination of slide 10 is set up in a plurality of relays $33a$, $33b \ldots 33n$ in the destination register and these relays have contacts 150 which control the inputs to the adding circuit 35 which has adding stages $A_1, A_2 \ldots A_n$ corresponding to comparator stages $C_1, C_2 \ldots C_n$. Each relay $33a \ldots 33n$ represents a particular digit of the destination number and has a contact 150 in an input connection 151A to a corresponding one of the adder stages $A_1, A_2 \ldots A_n$. When any contact 150 is open, the corresponding input connection 151A has voltage thereon indicating a binary 0 and when closed, a voltage representing a binary 1. Each of the adding stages has a second input connection 151B upon which a digit value appears and which represents one digit of the anticipate number. Each adding stage $A_1, A_2 \ldots A_n$ has an output connection 153 connected to the input terminal 105 of the corresponding comparator stage. Each of the adding stages will add the digits appearing on the inputs 151A, 151B thereto and carry a digit from the preceding stage and provide a sum output on the corresponding output connection 153, which may be 1 or 0, and will provide a carry digit for the next stage. The carry connections between stages are not shown but are well understood in the art.

The adder circuit functions to add the feed anticipate number or the rapid traverse anticipate number to the destination numbers and the anticipate numbers to be added are applied to the input connections 151B of the adder stages.

In the illustrated embodiment, the feed anticipate number is a five-digit number and is added to the five least significant stages $A_1, A_2 \ldots A_5$ of the adder. The digits of the feed anticipate number are set up in five switches $157a \ldots 157e$ which have switch arms 158 that are adapted to engage a contact 160 when the digit represented by the switch is a 0, or a contact 161 when the digit represented by the switch is a 1. The switch arms 158 are connected to the input connection 151B of the stage of the adder corresponding in significance to the digit represented by the switch and the connection between the switch arm and the corresponding input connection 151B includes the normally closed contacts 96PDR–1 of the relay 96PDR with the exception of switch 157e. The switch arm of switch 157e is connected to the input connection 151b by the contacts 98PFC–5 of the relay 98PFC which is the feed anticipate relay. The input connections 151B are tied to a source of negative potential which represents a binary 0 and this potential is applied to the input connection unless the input connection 151B is tied to ground by the corresponding one of the switches $157a \ldots 157e$ or by some other connection.

The contacts 161 of the switches $157a \ldots 157e$ are connected to a connection 163 through the normally closed contacts 99PDF–1 of the relay 99PDF and the connection 163 is, in turn, connected to ground by a connection including the normally open contacts 98PFC–2 of the relay 98PFC. Consequently, the contacts 161 are at ground potential whenever the relay 98PFC is energized and the relay 99PDF de-energized. It will be recalled that the relay 98PFC is energized when the feed anticipate number is to be added to the destination number and the relay 99PDF is de-energized except when the system is operating in a reverse direction and the anticipate number is to be subtracted. Consequently, when the control system is set to move the slide 10 in a forward direction at a feed rate, the contacts 161 of the switches 157a . . . 157e are tied to ground so that when any one of the contact arms 158 is moved into engagement with its corresponding contact 161, a binary 1 is applied to the corresponding adder stage. This is appropriate since it will be recalled that the anticipate number is to be added to the destination number when the slide 10 is moving in a forward direction. The addition of the anticipate number represented by the switches 157a . . . 157e to the destination number modifies the outputs of the adder and causes the comparator 30 to produce an arrive signal at a position in advance of the one represented by the destination number set in the destination register. It will be recalled that when the slide 10 reaches this advance position, the relay 98PFC is de-energized. This will open its contacts 98PFC-2 in the circuit for connecting the contacts 161 to ground, and when this happens, the feed anticipate number is changed to 0 since all inputs 151B are now at the negative potential and the destination number is no longer modified by the adder.

Referring to FIG. 2A, it will be noted that the contacts 160 are also connected to the connection 163 and, in turn, to ground through the contacts 98PFC-2 by a connection including the normally open contacts 99PDF-2. It will be recalled that when the slide 10 is to be operated in a reverse direction, the relay 99PDF is energized to effect the subtraction of the anticipate number set in the swtiches 157a . . . 157e. The energization of the relay 99PDF will break the connection of the contacts 161 to ground but will connect the contacts 160 to ground by closing contacts 98PDF-2 provided the relay 98PFC is energized as it is when the slide 10 is moving toward its destination position in a reverse direction and at a feed rate.

Therefore, by the energization of relay 99PDF, the binary values appearing on the switch arms 158 is a complement of the digits set in the switches 157a . . . 157e.

It will be recalled that when the control system is operating in a reverse direction, the anticipate number must be subtracted from the destination number. This can be done in binary arithmetic by reversing the state of each digit of the number to be subtracted, adding the resultant number to the number from which the subtraction is to be made, adding a 1, and then discarding the most significant digit in the sum. The anticipate number is subtracted, in the illustrated embodiment, by changing the voltage on each of the switch arms 158 and by applying a 1 to each of the higher significant stages of the adder. This is done in the illustrated embodiment when the relay 99PDF is energized to signify that the circuit or motor is operating in a reverse direction. When the relay 99PDF is energized, the contacts 161 of the switches 157a . . . 157e are now disconnected from ground by the opening of the contacts 99PDF-1 and the contacts 160 are connected to ground by the closing of contacts 99PDF-2. Accordingly, the number being added to the first five least significant stages of the adder is complemented. The energization of relay 99PDF also closes contacts 99PDF-3 connected to the input connection 151B of each of the adder stages $A_6$ . . . $A_9$ to connect the input connection to 163, to ground these input connections and apply a 1 to these adder stages. It is necessary that a 1 also be applied to the other adder stages and to this end, the relay 97PDC has contacts 97PDC-1 which complete a circuit to the input connections 151B of each of the adder circuit stages of higher significance than stage $A_9$ to connect these connections to ground and also closes its contacts 97PDC-2 to connect the carry connection of the least significant adder stage to ground to apply a 1 thereto to effect subtraction according to the preceding rule.

The rapid traverse anticipate number is a nine-digit number and is set into the fifth through ninth stages of the adder, the first four digits being 0. The rapid traverse number is set up in a plurality of switches 17a . . . 17e which are two-position switches having contacts 171, 172 with a switch arm 173 engageable with either of the contacts 171, 172. The input connections 151B of the stages $A_5$ . . . $A_9$ of the adder are each connected to one of the switch arms 173 through respective contacts 99PDF-4 with the exception of input connection 151B of adder stage $A_5$ which is connected to the corresponding switch arm by normally open contacts 90PRC-3 of the rapid anticipate relay 90PRC. Each switch 170a . . . 170e may be set to apply a 1 or a 0 to the corresponding input connection 151B. When the relay 90PRC is energized to close its contacts 90PRC-2 and when the relay 96PDR is de-energized signifying operation in a forward direction, the contacts 172 are connected to ground through the contacts 90PRC-2 and normally closed contacts 96PDR-2 so that, if the switch arm 173 engages this contact, a voltage indicating a 1 is applied to the corresponding stage of the adder; while if the arm 173 is in engagement with the corresponding contact 171, the input to the adder stage is a binary 0. If the operation is to be in a reverse direction and the rapid traverse number subtracted, the contacts 96PDR-2 of relay 96PDR in the circuit to the contacts 172 are open and the contacts 96PDR-3 of relay 96PDR are closed to make the contacts 171 of the switches 170 a binary 1 and the contacts 172 a binary 0 to complement the rapid traverse number. The relay 96PDR is energized for reverse operation as described above. When the operation is in a reverse direction, the energization of the relay 96PDR closes its normally open contacts 96PDR-4 in the circuits to the input connections 151B of the adder stages $A_1$ . . . $A_4$ to connect these contacts to ground through the now closed contacts 90PRC-2 of the rapid traverse anticipate number relay to complement the 0 being applied to the first four stages by making it a 1 in accordance with the rule of subtraction. Furthermore, the relay 97PDC is again energized to complement the stages which are more significant than the stages to which the rapid traverse anticipate number is applied and to add a 1 to the complemented number.

When the slide arrives at the position corresponding to the destination number modified by the number added by the adder, the relay 90PRC or 98PFC and the relay 97PDC are de-energized in the manner described above to render the switches 157, 170 ineffective to add a number to the adder and, consequently, the inputs to the adder stages are 0 and the destination number appears on the outputs from the adder stages and is applied to the inputs of the comparator.

It is desirable that the signal circuit to the servodrive 14 be grounded at different times during the operation of the machine to prevent spurious signals from being applied to the servomotor drive. To this end, the forward relay 65PF is provided with normally closed contacts 65PF-10 which connect a junction between the contacts 65PF-1 and the contacts 64PR-2 to ground. Consequently, when the relay 52PX is energized to render the servodrive 14 responsive to the signal circuit shown in the drawing, the input of the servodrive 14 is grounded through the normally closed contacts 64PR-2 of the reverse relay 64PR and the normally closed contacts 65PF-10 of the forward relay 65PF until the direction of motion for the slide 10 is selected and either the relay 65PF or the relay 64PR picked up. It will further be recalled that the relay 80PBK is energized when the relay 70PPR is first actuated to indicate that movement is necessary and remains energized until the relay 70PPR is de-energized upon arrival at the anticipate position and subsequently re-energized to effect continued movement upon the removal of the anticipate number. At the anticipate position, the rate of movement of the slide 10 is changed to a crawl, if the rate before the anticipate position has been higher than a crawl rate. The relay 80PBK has normally closed contacts 80PBK–10 which connect the junction 100 to ground so that after the slide 10 reaches the anticipate position and the relay 80PBK–10 de-energized the junction 100 is connected to ground. This connection will cause the input to the servodrive 14 to be grounded when the final destination is reached. If the slide is moving in a forward direction to the final position, the relay 36PPA will be energized and the crawl voltage for approaching the final position is applied from the junction 61 through the contacts 36PPA–2 and contacts 65PF–1 to the servodrive 14. The normally closed contacts 36PPA–6 of relay 36PPA which are now open are in a circuit including the relay contacts 80PBK–10 and will connect the input of the servodrive 14 to ground through the contacts 65PF–1 when the slide 10 reaches its destination position and the relay 36PPA de-energized to open the contacts 36PPA–2 and close the contacts 36PPA–6. Similarly, when the system is operating in a reverse direction at a crawl rate, when the relay 36PPA–6 is energized indicating arrival at the destination position, the input to the servodrive 14 through the contacts 64PR–1 is grounded by the closing of contacts 36PPA–7 upon arrival at the destination position. The contacts 36PPA–7 complete a circuit to ground with the contacts 80PBK–10; consequently, it can be seen that the contacts 80PBK–10 cooperate with the contacts 36PPA–6 and the contacts 36PPA–7 to connect the input of the servodrive 14 to ground whenever the slide 10 moves to its destination position.

The relay 62PTR is also preferably provided with contacts 62PTR–10 which, when closed, ground a junction 200 between the contacts 62PTR–1 and the contacts 54PCR–2. When the slide 10 is approaching an anticipate position at a rapid rate, the relay 62PTR is energized so that the junction 200 is grounded and when the slide 10 arrives at the anticipate position, the relay 54PCR is de-energized to close its contacts 54PCR–2 connecting the junction 200 to the junction 61 to ground the junction 61. When the relay 62PTR drops out, with the time delay as described above, the contacts 62PTR–10 will open to disconnect the junction 200 from ground and to allow the crawl voltage at terminal 57 to be applied to the junction 61. However, all stops are made by applying the brake and grounding the servodrive input signal.

The feed voltage for the servodrive 14 has been described as a variable or an adjustable voltage. The feed voltage may be a voltage, in certain types of machine tools having a rotating work-supporting spindle, which varies in accordance with the rotation of the spindle to effect a particular tool advance per revolution of the spindle and, if this is the case, the feed signal may vary from a magnitude higher than the crawl rate to a magnitude below the crawl signal as the slide 10 is moved toward the destination position. If this occurs before the anticipate position is reached, it will be appreciated that the relay 81PNC will be picked up to open its contacts 81PNC–2 to de-energize either the relay 98PFC or the relay 90PRC to effect a removal of the anticipate number from the comparator and to prevent the circuit from switching to a crawl rate at the anticipate position. If the circuit has switched to a crawl rate, i.e., if the feed signal is lower than the crawl signal when the system is operating at a crawl rate, the operation of the relay 81PNC will have no effect on the circuit and the slide 10 will continue to proceed at a crawl rate.

It is desirable that the brake 86 be applied quickly when it is energized to assure accurate positioning. To this end, the brake 86 is connected to the positive side of the energizing power supply (see FIG. 2) by a resistance 200 and a capacitance 201 connected in parallel. When the circuit is first completed for energizing the brake, the condenser 201 acts as an effective short about the resistor to allow a large transient current to flow until the condenser charges.

The present invention has been embodied in a system wherein the destination position and the actual position of the slide are represented by electrical manifestations which represent a number in binary form and the system is, therefore, what is termed a digital system. It will be appreciated by those skilled in the art that the broader aspects of the present invention are equally applicable to a system wherein the positions are represented by the analogue of an electrical signal. For example, the magnitudes of an electrical signal could represent the displacement of the slide or of the destination position from a reference position and the comparator 30 could compare the magnitudes while in analogue form rather than the digits of a multidigit number representing the displacement. Furthermore, the increment has been described as being algebraically added to the destination number; the increment could be added to or subtracted from the actual position number and in such a case the increment would be subtracted from the actual position number when the slide is moving in a forward direction and added to the actual position number when the slide is being moved in a reverse direction.

In the illustrated embodiment when the slide is to be moved in a forward direction, operation of the slide is effected when the relay 36PPA is energized and stopped when the relay is de-energized, and when the movement of the slide is to be in a reverse direction, the control circuits are changed so that the slide is operated in response to the de-energization of the relay 36PPA and stopped in response to energization of the relay 36PPA. It will be understood by those skilled in the art that the destination number could be applied to one input of the comparator 30 when the slide is operating in one direction and to the other input when the slide is to be operated in the opposite direction with the destination number being applied to the input different from that of the actual position number. If this were the case, the relay 36PPA would have one condition of energization when the slide is to be moved regardless of the direction in which the slide is to be operated. Furthermore, if this arrangement were effected, it would be obvious to one skilled in the art that the increment could either be added to either one of the inputs and would be added to the actual position number when moving in one direction and to the destination number when moving in the other direction so that there would be no need to provide circuit means for selectively effecting the addition or the subtraction of the increment depending upon the direction of movement.

While the preferred embodiment of the present invention has been described in considerable detail, it is hereby my intention to cover all modifications, constructions, and arrangements which fall within the ability of those skilled in the art and within the scope and spirit of the present invention.

What I claim is:

1. In a positioning system comprising a movable member, multispeed actuating means for moving said member from a position on one side of a destination position to the destination position, and a comparator for comparing an electrical manifestation indicative of a destination position and an electrical manifestation indicative of the actual position of said member and for controlling said actuating means to move said member toward said destination position to make said manifestations correspond, said comparator having a first output signal when said actuating member is displaced to said one side of said destination and a second output signal when said member has arrived at said destination position from said one side, destination selecting means for selectively applying an electrical manifestation to said comparator representing a final destination, position indicating means for applying a manifestation to said comparator representing the actual position of said member, control means for said actuating means responsive to said comparator to effect operation in response to said first output signal and stop operation in response to said second output signal and including first means actuatable in response to said first signal to condition said control means to effect operation of said actuating means at a reduced rate in response to a first change in the output of said comparator from said first signal to said second signal and for effecting the operation of said actuating means at said reduced rate and then stopping said member in response to the occurrence of said first signal and second signal in sequence subsequent to said first change in the output of said comparator, and means for modifying one of the manifestations being compared by said comparator to provide a change in output of said comparator at a position displaced a predetermined distance toward said movable member from said destination position and actuatable in response to said first signal when effecting the actuation of said first means for effecting modification of said one of said manifestations and rendered ineffective and nonresponsive to said first signal in response to said first change in said output from said comparator.

2. In a positioning system as defined in claim 1 wherein said first output signal is the same for all positions to one side of the position set therein and said second output signal is the same for all positions on the other side of the position set in the comparator and said actuating means is a reversible actuating means and means is provided for selectively effecting operation in either direction and for selectively reversing the response of said control means to said output signals to effect the operation of said actuating means in response to said second output signal and the stopping of said actuating means in response to said first output signal.

3. In a positioning system as defined in claim 1 wherein said actuating means is a servomotor controlled by an input signal and said system includes a signal source providing a plurality of input signals and said control means includes means for making and breaking a circuit from said signal source to said servomotor in accordance with the comparison of the manifestations and said first means includes speed selecting means actuatable in response to said first signal to connect said circuit to one signal input and in response to said first change in signal to connect said circuit to a second one of said input signals.

4. In a control system for positioning a member in accordance with a destination number representing the displacement of a destination for the member from a reference position, multispeed actuating means for moving said member toward said destination position, means providing a number representative of the displacement of said member from said reference position and a number representing the displacement of a destination position from said reference position, comparator means receiving and comparing said numbers, said comparator means including adding means for algebraically adding a third number representing a predetermined increment to one of said numbers to provide a number representing a position in advance of said destination position and actuatable to a predetermined condition to render said adding means ineffective to introduce said increment, said comparator means including an output element having a first condition indicating displacement of said member in a predetermined direction from said destination position and a second condition when said member is moved to effect correspondence of the numbers being compared, sequence circuit means responsive to changes in the conditions of said output element and having a first condition wherein said actuating means is ineffective to move said member and responsive to an actuation of said output element to its said first condition to render said actuating means effective to operate at a first rate and to actuate said adding means to a condition algebraically adding said increment and actuated to a further condition in response to subsequent actuation of said output element from its said first condition to its said second condition to render said actuating means effective to operate said member at a second rate in response to a first subsequent change in said output element and to render said adding means ineffective to add said increment and to condition said actuating means to be operated to its said first condition in response to the next change in condition of said output element subsequent to said first subsequent change.

5. In a control system as defined in claim 4 wherein said element has its said second condition for all positions of said member displaced to the side of the position set therein different from the side where it has its said first condition and said actuating means is a reversible actuating means, and said system further includes control means operatively connected to said actuating means to select the direction of operation of the latter and conditioning means responsive to said control means to reverse the response of said sequence circuit means to said output element to initiate operation of said actuating means and add said increment in response to said second condition of said output element and to change speed and remove said increment in response to a first change from said second condition to said first condition and back to said second condition and to subsequently stop said actuating means in response to said first condition.

6. In a control system as defined in claim 4 wherein said conditioning means conditions said adding means to add said third number for one direction of movement and to complement said third number to effect subtraction on the other direction of movement of said member.

7. In a positioning system comprising a movable member, multispeed actuating means for moving said member from a position on one side of a destination to the destination, a comparator for comparing an electrical manifestation indicative of the destination position and an electrical manifestation indicative of the actual position of said member and for controlling said actuating means to move said member toward said destination position to make said manifestations correspond, said actuating means including a first clutch for effecting a driving of said movable member at one rate and a second clutch for effecting a driving of said movable member at a second rate slower than said first rate, said comparator having a first output signal when said actuating member is displaced to said one side of said destination and a second output signal when said member has arrived at said destination position, means for selectively applying an electrical manifestation to said comparator representing a final destination, control means for said actuating means responsive to said comparator to effect operation in response to said first signal and stop operation in response to said second signal and including first means for selectively effecting energization of said first clutch in response to said first output signal and for de-energizing said first clutch and energizing said second clutch in response to a first change in the output signal from said first output signal to said second output signal, said system further including means rendered effective in response to the actuation of said first means for modifying one of the manifestations being compared to provide a change in output of said comparator at a position a preset distance in advance of said destination and rendered ineffective in response to said first change in the output of said comparator.

8. A positioning system wherein a member is reciprocable along a path having a reference position at or beyond one end thereof and positions along said path represented by numbers having magnitudes representing the displacement of the particular position from the reference position, reversible actuating means operatively connected to said member and selectively operable to move said member toward or away from said reference position, position indicating means operatively connected to said actuating means and member and providing an electrical representation of the number corresponding to the actual position of the member along said path, circuit means providing an electrical representation of a number corresponding to a desired destination position for said member, comparator means for comparing electrical representations corresponding to first and second numbers and having a first output when the first number is larger than the other and a second output when the second number is larger, said position indicating means and said circuit means being connected to said comparator to provide said first and second numbers to be compared, control means for said actuating means comprising a control element energizable and de-energizable to effect and stop operation of the actuating means respectively, means for selecting the direction of operation of said actuating means, means interconnecting said comparator means and said control element to effect the energization thereof for one of said outputs and the de-energization thereof for the other output, said comparator means including means for selectively effecting said one output when said destination number is smaller than the position number or for effecting said one output when the position number is smaller than the destination number.

9. In a positioning system as defined in claim 8 wherein adding means is provided for algebraically adding an increment to one of said numbers to effect correspondence of the numbers at an advanced position in advance of the destination position, said adding means being actuatable between a condition for algebraically adding said increment to said one of said numbers and a second condition in effective to add said increment, and means responsive to said outputs when said member arrives at said advance position for actuating said adding means to its said second condition and for changing the rate of operation of said actuating means.

10. In a positioning system comprising a movable member, multispeed actuating means for moving said member at different rates, comparator means for comparing an electrical manifestation representing the position of a final destination for said member with an electrical manifestation representing the actual position of said member and for effecting operation of said actuating means to move said member to produce correspondence in said electrical manifestations, said system including adding means for algebraically adding a preset increment to one of said manifestations to provide correspondence of the manifestations being compared at an intermediate station in advance of said final destination, said comparator means including means responsive to correspondence of said numbers being compared on arrival at said intermediate station for effecting a change of operating rate to a slower speed and to eliminate said increment whereby said comparing means operates to compare said destination and said actual position manifestations.

11. In a positioning system as defined in claim 10 wherein said electrical manifestations are multidigit numbers with the digits having binary representation.

12. In a positioning system as defined in claim 10 wherein said actuating means is a reversible actuating means operable to move said member in one direction to a position represented by a manifestation smaller in magnitude than the actual position manifestation or to move said member in a reverse direction to a position represented by a larger manifestation and said adding means including means actuatable between different conditions for effecting the subtraction and addition respectively of said increment to one of said manifestations, said system including means for actuating the last-said means to a certain condition for a certain direction of operation.

13. In a positioning system, a movable member to be positioned, a comparator for comparing two numbers and having a first output when one number is larger than the other and a second output when said one number is smaller than the other, a two state device actuatable between two conditions upon the energization and de-energization thereof, actuating means controlled by said device and operatively connected to said movable member and rendered effective in response to said device being actuated to one condition and rendered ineffective in response to said device being actuated to its other condition, first means connecting said device to be energized by one output of said comparator and de-energized by the other output and second means connecting said device to said actuating means to respectively effect and stop operation of said actuating means and the movement of said member in response to said first and second outputs respectively, said first and second means including means for interchanging the response of said device to said comparator to effect and stop the operation of said actuating means and the movement of said member in response to said second and first outputs respectively.

14. In a positioning system, a movable member to be positioned, a comparator for comparing two numbers and having a first output when one number is larger than the other and a second output when said one number is smaller than the other, means for applying to said comparator a number indicative of the displacement from a reference position of a position to which said member is to be moved, position indicating means responsive to the position of said member for applying a second number to said comparator indicative of the displacement from said reference position of the immediate position of the member, and actuating means controlled by said comparator and operatively connected to said member and rendered effective in response to one of said outputs to drive said member to reduce the difference in the numbers being applied to said comparator and to said second output to stop the movement of said member, and means for selectively effecting operation of said actuating means in response to either of said outputs and the stopping of the actuating means in response to the other of said outputs.

References Cited in the file of this patent

UNITED STATES PATENTS

| | | |
|---|---|---|
| 2,489,689 | Wald | Nov. 29, 1949 |
| 2,537,427 | Seid et al. | Jan. 9, 1951 |
| 2,727,194 | Seid | Dec. 13, 1955 |
| 2,840,771 | Kamm | June 24, 1958 |
| 2,909,769 | Spaulding | Oct. 20, 1959 |
| 2,943,251 | Hull | June 28, 1960 |
| 3,011,151 | Ketchledge | Nov. 28, 1961 |
| 3,045,157 | Jacquet et al. | July 17, 1962 |